(12) United States Patent
Novoplanski (10) Patent No.: US 11,752,807 B2
(45) Date of Patent: Sep. 12, 2023

(54) BEADLOCK SYSTEM FOR WHEEL ASSEMBLY

(71) Applicant: Galileo Wheel Ltd., Mevasert Zion (IL)

(72) Inventor: Avishay Novoplanski, Moshav Beit Zait (IL)

(73) Assignee: GALILEO WHEEL LTD., Mevasert Zion (IL)

( * ) Notice: Subject to any disclaimer, the term of this patent is extended or adjusted under 35 U.S.C. 154(b) by 468 days.

(21) Appl. No.: 16/922,059

(22) Filed: Jul. 7, 2020

(65) Prior Publication Data

US 2021/0001670 A1 Jan. 7, 2021

Related U.S. Application Data

(60) Provisional application No. 62/871,147, filed on Jul. 7, 2019.

(51) Int. Cl.
*B60C 15/024* (2006.01)
*B60C 15/02* (2006.01)
*B60B 21/12* (2006.01)

(52) U.S. Cl.
CPC ........ *B60C 15/0213* (2013.01); *B60B 21/125* (2013.01)

(58) Field of Classification Search
CPC . B60C 15/02; B60C 15/0209; B60C 15/0213; B60C 15/0216; B60C 15/022; B60C 15/0223; B60C 15/0233; B60C 15/024
See application file for complete search history.

(56) References Cited

U.S. PATENT DOCUMENTS

| 2,663,061 A | 12/1953 | Zarth |
| 3,915,214 A * | 10/1975 | Pile .................. B60B 21/12 |
| | | 152/406 |
| 9,656,515 B2 | 5/2017 | Novoplanski |
| 10,343,456 B2 | 7/2019 | Novoplanski |

FOREIGN PATENT DOCUMENTS

| GB | 1398621 | * | 6/1975 |
| GB | 1439195 | * | 6/1976 |

* cited by examiner

*Primary Examiner* — Justin R Fischer
(74) *Attorney, Agent, or Firm* — Mark M. Friedman (57) ABSTRACT

A tire and beadlock clip system for assembly on a rim employs a tire of a type having an annular recess in each sidewall of the tire. As a result of the recessed sidewall structure, one or more beadlock clip can be directly engaged, after seating of the tire, between a corresponding abutment surface region, provided on the outer surface of the sidewall and oriented to face away from the rim lip, and an opposing surface of the rim, thereby opposing separation of the bead region from the bead seat. Preferably, the clips are resilient clips which can be snap-fit into engagement manually or with a mallet. Alternatively, a positive clamping mechanism may be provided.

9 Claims, 9 Drawing Sheets

BEADLOCK SYSTEM FOR WHEEL ASSEMBLY

FIELD AND BACKGROUND OF THE INVENTION

The present invention relates to a beadlock system based on a beadlock clip and corresponding tire configuration, and a wheel assembly and method employing this system.

In cases of high torque or high lateral load, and particularly for tires designed to be operated at low pressures or airless, the bead region of the tire is at risk of slipping across the surface of a wheel rim and/or of separating from the rim. In order to address this problem, some vehicles employ beadlock arrangements, which are typically implemented as a pair of flanges deployed inside and outside the tire which clamp the tire bead between them. Such arrangements are usually based on splitting the rim into two parts to allow support of the tire bead from inside, and add significant weight and bulk to the wheel assembly.

Patent publications WO 2018/055624, WO 2013/014676 disclose various wheel assemblies in which the sidewalls have a V-shaped cross-sectional profile defining an annular recess between a radially-inner conical surface and a radially-outer conical surface.

SUMMARY OF THE INVENTION

The present invention is a beadlock system based on a beadlock clip and corresponding tire configuration, and a wheel assembly and method employing this system.

According to the teachings of an embodiment of the present invention there is provided, a wheel assembly comprising: (a) a rim having two bead seats, each bead seat at least partially defined by a corresponding rim lip; (b) a tire mounted on the rim, the tire having two bead regions, each of the bead regions seated against a corresponding one of the bead seats, the tire having a non-stretchable tread extending between two shoulder regions, and two sidewalls, each side wall extending between one of the shoulder regions and a corresponding one of the bead regions, each of the sidewalls including a first wall portion adjacent to the bead region and extending inwards relative to a width of the tire to a deflection region, and a second portion extending outwards relative to the width of the tire from the deflection region to the shoulder region, thereby defining an annular recess in an outer surface of each of the side walls, wherein the first wall portion of at least one of the side walls provides at least one abutment surface region facing away from the corresponding rim lip; and (c) at least one beadlock clip engaging a corresponding one of the at least one abutment surface region and an opposing surface of the rim, thereby opposing separation of the bead region from the bead seat.

According to a further feature of an embodiment of the present invention, the at least one abutment surface region is implemented as a plurality of the abutment surface regions spaced around the first wall portion, and wherein the at least one beadlock clip is implemented as a plurality of the beadlock clips.

According to a further feature of an embodiment of the present invention, the opposing surface of the rim is a surface of the rim lip.

According to a further feature of an embodiment of the present invention, each of the beadlock clips is implemented as a resilient metal clip which is elastically deformable so as to be transiently deformed during deployment engaging the abutment surface and the opposing surface of the rim.

According to a further feature of an embodiment of the present invention, the abutment surface and the opposing surface define a clamping direction of the beadlock clip, the clamping direction forming an acute angle with an inward axial direction of the wheel assembly.

According to a further feature of an embodiment of the present invention, the abutment surface regions and the opposing surfaces of the rim each provide an undercut angle relative to the clamping direction.

According to a further feature of an embodiment of the present invention, each of the abutment surface regions is associated with a recessed channel in the outer surface of the first wall portion such that at least part of the beadlock clip is countersunk in the outer surface.

According to a further feature of an embodiment of the present invention, each of the beadlock clips is formed from strip material.

According to a further feature of an embodiment of the present invention, the abutment surface regions and the beadlock clips are provided on both side walls of the tire.

There is also provided according to the teachings of an embodiment of the present invention, a method for securing a wheel assembly, the method comprising the steps of: (a) providing a wheel assembly comprising: (i) a rim having two bead seats, each bead seat at least partially defined by a corresponding rim lip, and (ii) a tire having two bead regions, a non-stretchable tread extending between two shoulder regions, and two sidewalls, each side wall extending between one of the shoulder regions and a corresponding one of the bead regions, each of the sidewalls including a first wall portion adjacent to the bead region and extending inwards relative to a width of the tire to a deflection region, and a second portion extending outwards relative to the width of the tire from the deflection region to the shoulder region, thereby defining an annular recess in an outer surface of each of the side walls, wherein the first wall portion of at least one of the side walls provides at least one abutment surface region facing away from the rim lip; (b) deploying the tire on the rim with each of the bead regions seated against a corresponding one of the bead seats; and (c) attaching at least one beadlock clip engaging the abutment surface region and an opposing surface of the rim, thereby opposing separation of the bead region from the bead seat.

According to a further feature of an embodiment of the present invention, the at least one abutment surface region is implemented as a plurality of the abutment surface regions spaced around the first wall portion, and wherein the attaching is implemented as attaching a plurality of the beadlock clips.

According to a further feature of an embodiment of the present invention, the beadlock clips are snap-on clips which are transiently deformed during deployment engaging the abutment surface and the opposing surface of the rim.

There is also provided according to the teachings of an embodiment of the present invention, a tire and beadlock clip system for assembly on a rim having two bead seats, each bead seat at least partially defined by a corresponding rim lip, the tire and beadlock clip system comprising: (a) a tire for mounting on the rim, the tire having two bead regions, each of the bead regions configured for seating against a corresponding one of the bead seats, the tire having a non-stretchable tread extending between two shoulder regions, and two sidewalls, each side wall extending between one of the shoulder regions and a corresponding one of the bead regions, each of the sidewalls including a first wall portion adjacent to the bead region and extending inwards relative to a width of the tire to a deflection region, and a second portion extending outwards relative to the width of the tire from the deflection region to the shoulder region, thereby defining an annular recess in an outer surface of each of the side walls, wherein the first wall portion of at least one of the side walls provides at least one abutment surface region oriented to face away from the corresponding rim lip; and (b) at least one beadlock clip configured for engaging a corresponding one of the at least one abutment surface region and an opposing surface of the rim, thereby opposing separation of the bead region from the bead seat.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a beadlock clip and corresponding wheel assembly.

The principles and operation of beadlock clips and wheel assemblies according to the present invention may be better understood with reference to the drawings and the accompanying description.

Referring now to the drawings, FIGS. 1-11B illustrate a number of variant implementations of a wheel assembly including beadlock clips according to certain embodiments of the present invention.

In general terms, a wheel assembly 10 according to an aspect of the present invention includes a wheel with a rim 12 flanked by two rim lips 14, interchangeably referred to as rim flanges, and a tire 16 deployable on the rim. The tire has a tread 30 flanked by two shoulder regions 34, and two non-stretchable bead regions 36 for mounting the tire to the rim 12 and against the rim lips 14. Each bead region 36 is connected via a sidewall to the corresponding shoulder region 34. Each sidewall has a first portion 38 extending from the bead region 36 inwardly relative to a width of the tire to a deflection region 40, and a second portion 42 extending outwardly relative to the width of the tire from the deflection region 40 to a corresponding one of the shoulder regions 34. In all respects other than those relating to the beadlock clip and its engagement, the wheel assembly is most preferably implemented according to the teachings of patent publication WO 2018/055624 or of patent publication WO 2013/014676, which are hereby incorporated by reference.

According to an aspect of the present invention, the bead region 36 and/or a part of first portion 38 adjacent to bead region 36 on at least one, and preferably both, sides of the tire has at least one, and preferably a plurality of, abutment surface regions 52, spaced around and facing away from the corresponding rim lip 14. At least one, and preferably a plurality of, beadlock clips 54 are deployed engaging one of the abutment surface regions 52 and an opposing surface of rim, preferably an outside surface of rim lip 14, thereby opposing separation of the bead region 36 from the bead seat. The term "facing away" is used herein in the description and claims to refer to a surface that includes at least one region at which a vector normal to the surface points away from the reference object, in this case, the closest region of the rim lip 14. In intuitive terms, the phrase "facing away" conveys an orientation of a surface which is suitable for engaging in order to apply a retaining force to prevent the bead region from separating from the rim lip.

It should be noted that the subdivision between the regions of the tire referred to as bead region 36 and first portion 38 is somewhat arbitrary. For the purpose of the definitions of the present application, the entire externally-exposed surface of the tire sidewall extending from the rim lip 14 to the flexion region 40 may be referred to as the first portion 38, even if the underlying carcass structure includes reinforcing cords and the like which contribute to the non-stretchable properties of the bead region 36.

Figure 1:
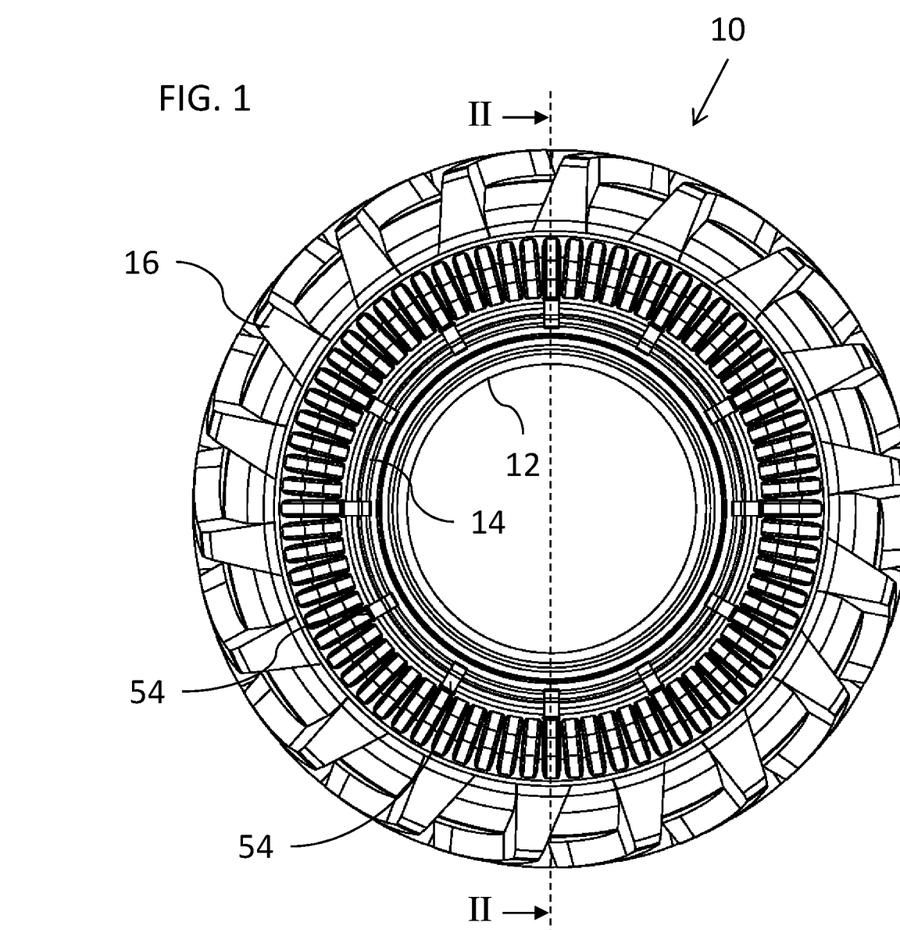
FIG. 1 is a side view of a wheel assembly employing a beadlock system based on a beadlock clip and corresponding tire configuration, constructed and operative according to the teachings of an embodiment of the present invention.
Figure 2:
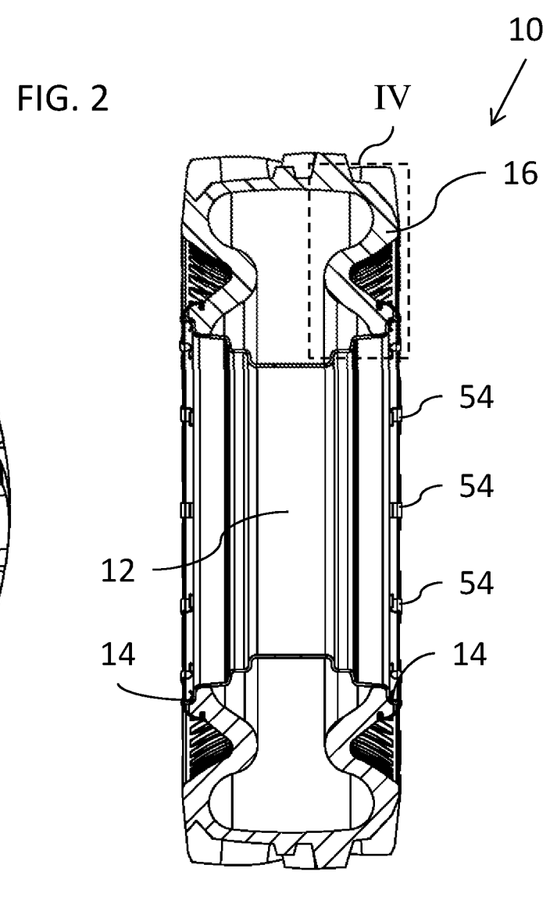
FIG. 2 is a cross-sectional view taken along plane II-II of FIG. 1.
Figure 3A:
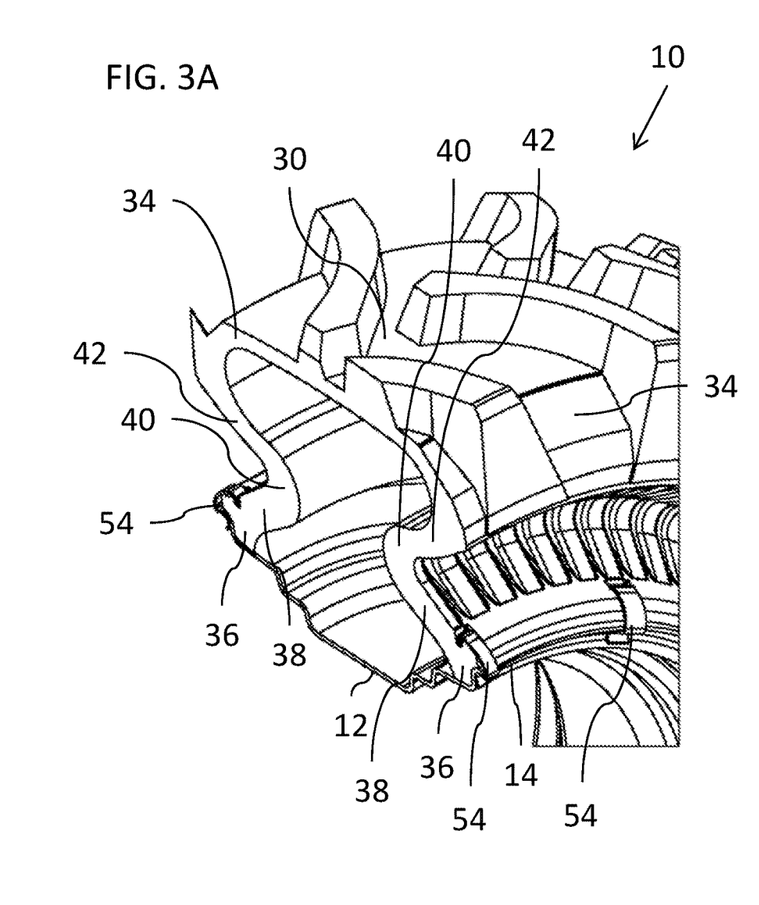
FIG. 3A is a partial, cut-away isometric view of the wheel assembly of FIG. 1 cut-away along plane II-II.
Figure 3B:
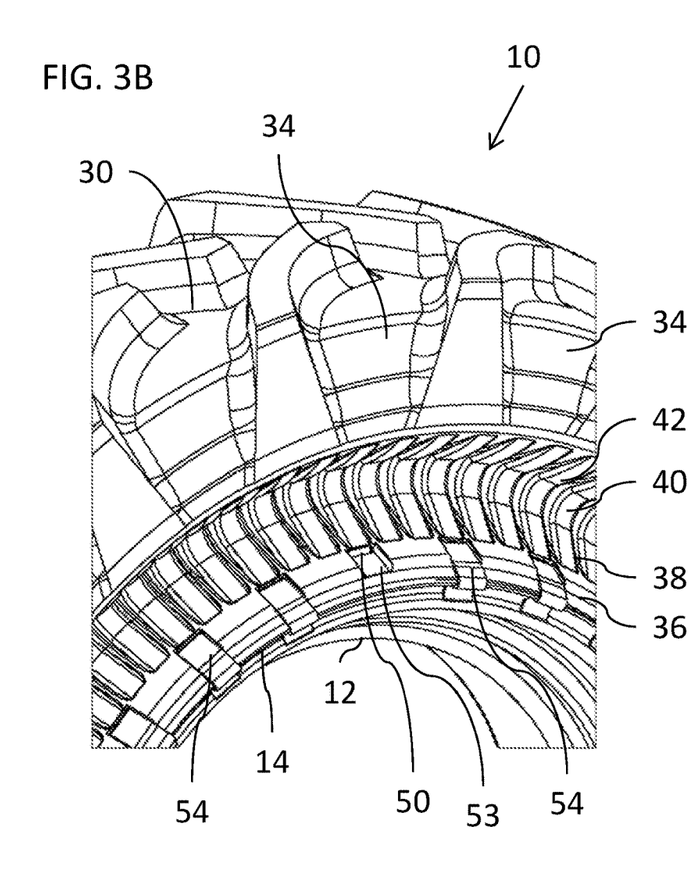
FIG. 3B is a partial isometric view of the wheel assembly of FIG. 1 illustrating a variant implementation of a tire having recessed channels for receiving beadlock clips.
Figure 4:
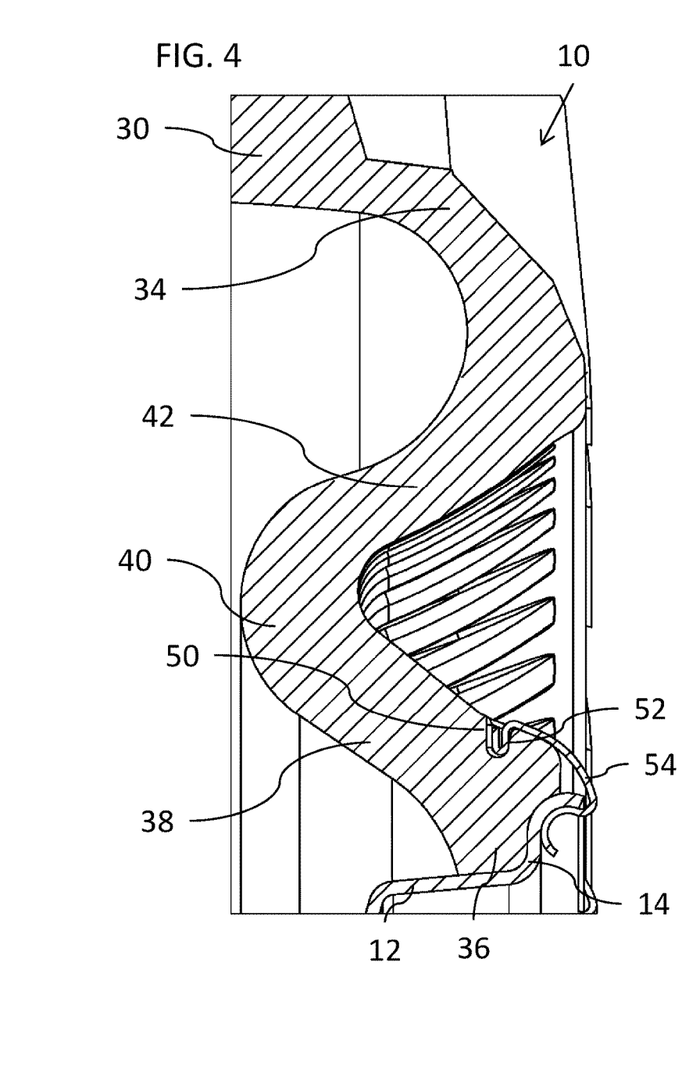
FIG. 4 is an enlarged view of the region of FIG. 2 designated IV.

According to certain embodiments, the abutment surface regions 52 are preferably provided as an inner surface of at least one slot 50 or other undercut feature that provides a correctly oriented abutment surface region 52 facing away from the corresponding rim lip 14. The slot 50 may be a localized feature sized to receive an individual clip 54, as best seen in the examples of FIGS. 3A and 3B, or may be part of an elongated slot 50 extending around part or all of the tire, as will be illustrated below with reference to FIGS. 7A, 7B and 9. Alternatively, the abutment surface region 52 may be provided by a wire or cable integrated with the tire, as illustrated below with reference to FIGS. 8A and 8B.

It should be noted that the present invention has a particular synergy with the aforementioned tire configurations as described in patent publications WO 2018/055624 and WO 2013/014676 which have side walls with a V-shaped cross-sectional profile defining an annular recess between radially-inner conical surface (first portion) 38 and radially-outer conical surface (second portion) 42. Specifically, because of the conically inwardly-sloping first portion 38 of the sidewall, it becomes feasible to provide an abutment surface region 52 which is both accessible for attachment of beadlock clips 54 and which is correctly oriented to allow application of forces that clamp bead region 36 against the wheel rim, providing clamping forces directed radially inwards towards the rim and/or with a significant component parallel to the wheel axis, thereby helping to prevent slipping of the bead relative to the rim circumferentially, thereby allowing delivery of enhanced rotary torque by means of friction from the rim to the tire, and/or helps prevent lateral separation of the bead from the rim lip. The tire of the present invention typically has internal structure (not illustrated here) including various carcass plies of reinforcing cords embedded in rubber, as is common practice in the art, and as described in the aforementioned publications. Such plies and/or additional cords provide non-stretchable properties to at least the bead regions and the tread, and typically also other regions of the tire, all as is known in the art.

Figure 5:
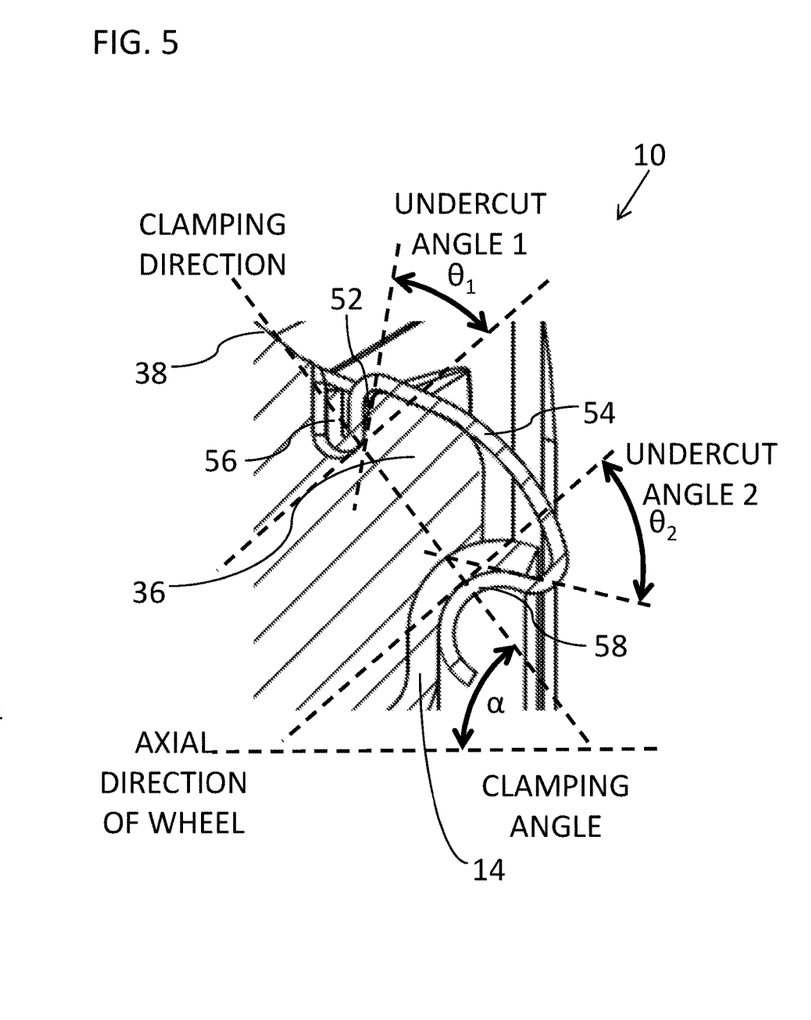
FIG. 5 is a schematic diagram of the region of FIG. 4 including a beadlock clip, and illustrating various preferred features relating to a clamping geometry.
Figure 6A:
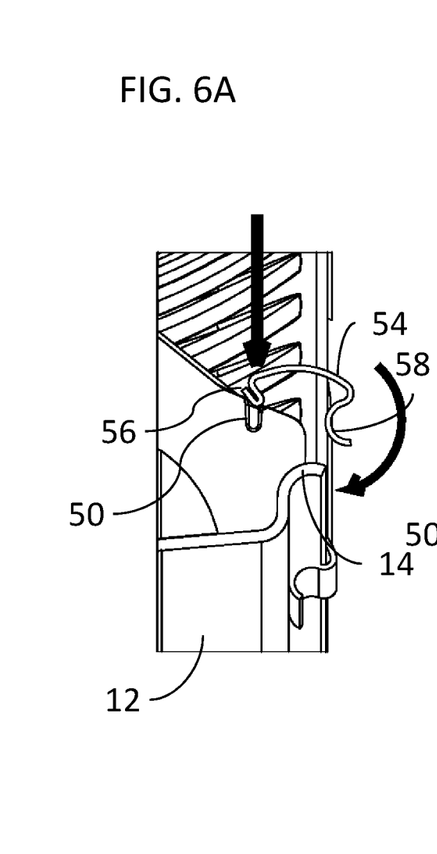
FIGS. 6A-6D are schematic partial views similar to FIG. 4 illustrating a sequence of positions of the beadlock clip during attachment of the clip.
Figures 6B, 6C:
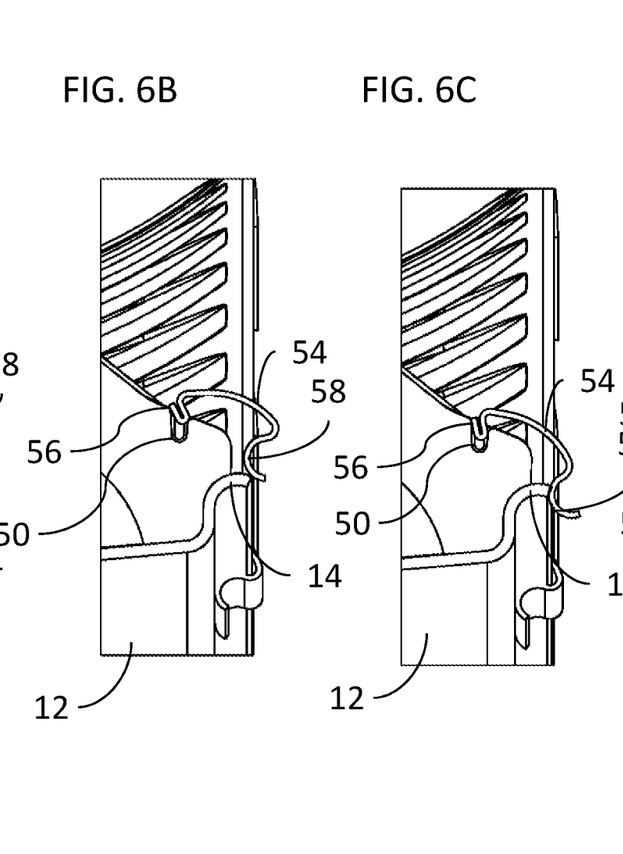
Figure 6D:
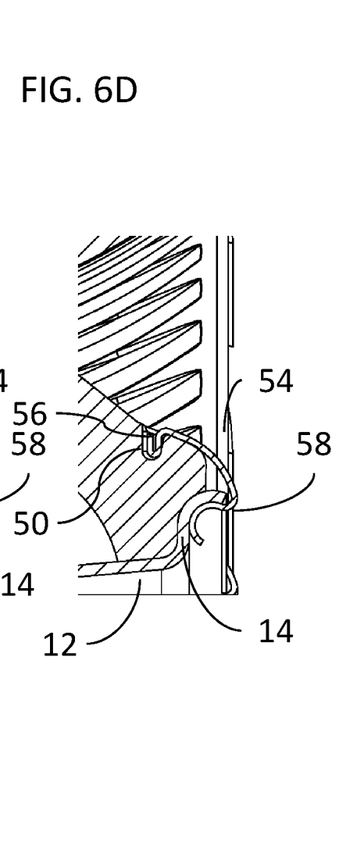

According to a first particularly preferred embodiment, beadlock clip 54 is implemented as a resilient clip, typically but not necessarily formed from metal, most preferably steel, and typically formed as a shaped clip of strip material, which engages slot 50 and rim lip 14 by transient deformation. An exemplary implementation is best seen in FIG. 5, where a first engagement portion 56 engages the slot 50 and a second engagement portion 58 engages the rim lip. FIGS. 6A-6D illustrate successive stages in a typical process of installing the clip, by first positioning portion 56 on slot 50 (FIG. 6A) and an outwardly-flared part of portion 58 against the rim lip (FIG. 6B). An inwards force applied to the clip in this state towards the wheel axis and/or laterally towards the tire forces the clip to momentarily deform, passing through the state of FIG. 6C to becomes seated in the final position shown in FIG. 6D, with the two engagement portions firmly seated with the corresponding abutment features of the slot and the rim lip. This transition can typically be achieved by manually force applied by hand, or by striking the back of the clip with a hammer or mallet.

In the final position, each of the engagement portions is preferably firmly engaged with the corresponding features by provision of an "undercut angle" as illustrated in FIG. 5. For the purpose of defining the undercut angle, a clamping direction may be defined as the primary direction in which resilient clamping forces are applied by the clip. A non-undercut abutment surface would be perpendicular to the clamping direction, as indicated by dashed lines in FIG. 5. The actual abutment surfaces over which the clip engagement portions would need to pass in order to be dislodged are inclined relative to those "non-undercut" lines by respective angles $\theta_1$ and $\theta_2$ as marked. It should be noted that this undercut geometry is particularly preferred where a snap-fit of the clips is desired. Many other implementations are possible without such an undercut geometry and, in some cases, may employ various forms of mechanical engagement or other forms of attachment to ensure that the clips do not become dislodged during use.

In a related feature, first engagement portion 56 may be acutely inclined relative to an elongated shaft or main body portion of beadlock clip 54 so as to effectively lock under an undercut formed by abutment surface region 52, thereby providing additional clamping of the clip into the material of the tire and helping to prevent first engagement portion 56 being dislodged under a wide range of conditions of load and deformation.

Optionally, as best illustrated in FIGS. 3B and 10A-11B, each of the abutment surface regions and/or its corresponding slot 50 is associated with a recessed channel 53 in the outer surface of first wall portion 38 such that at least part of beadlock clip 54 is countersunk in the outer surface. FIG. 3B illustrates wheel assembly 10 with one clip removed so as to reveal the shape of the slot and recessed channel more clearly. This countersinking of the beadlock clip is advantageous in certain circumstances, providing protection against abrasion by the clip under run-flat conditions and/or extreme conditions of load, if the first and second portions of the side wall were to come into contact.

As mentioned above, beadlock clips 54 may advantageously be formed from strip material. "Strip material" in this context is defined as a structure in which the cross-sectional shape has a width that is at least an order of magnitude greater than the thickness. Such an implementation is particularly advantageous for snap-fit implementations of the clips. In cases where a bolt or other positive-displacement locking mechanism are used, as exemplified below, a relatively thicker and more rigid clip may be used.

Although illustrated herein as a plurality of clip configuration spaced around the rim lip, it should be noted that the number of clips is not limited. In certain cases, particularly for small size and relatively low torque applications, even a single beadlock clip and corresponding abutment surface region may be sufficient to enhance the frictional locking of the bead to the rim, and hence improve the overall performance of the wheel assembly. More typically, a plurality of the clip configurations are spaced around the rim lip and bead, the number depending upon the size of the wheel and the loads likely to be encountered. In most cases, at least three clips are used on each side of each tire, and more preferably at least 5 clips. In certain cases, it may be preferable to have at least 10 clips, such as in the non-limiting example of 12 clips illustrated here. For large equipment, arrangements with 20-30 clips per tire sidewall are typically used.

Figure 7A:
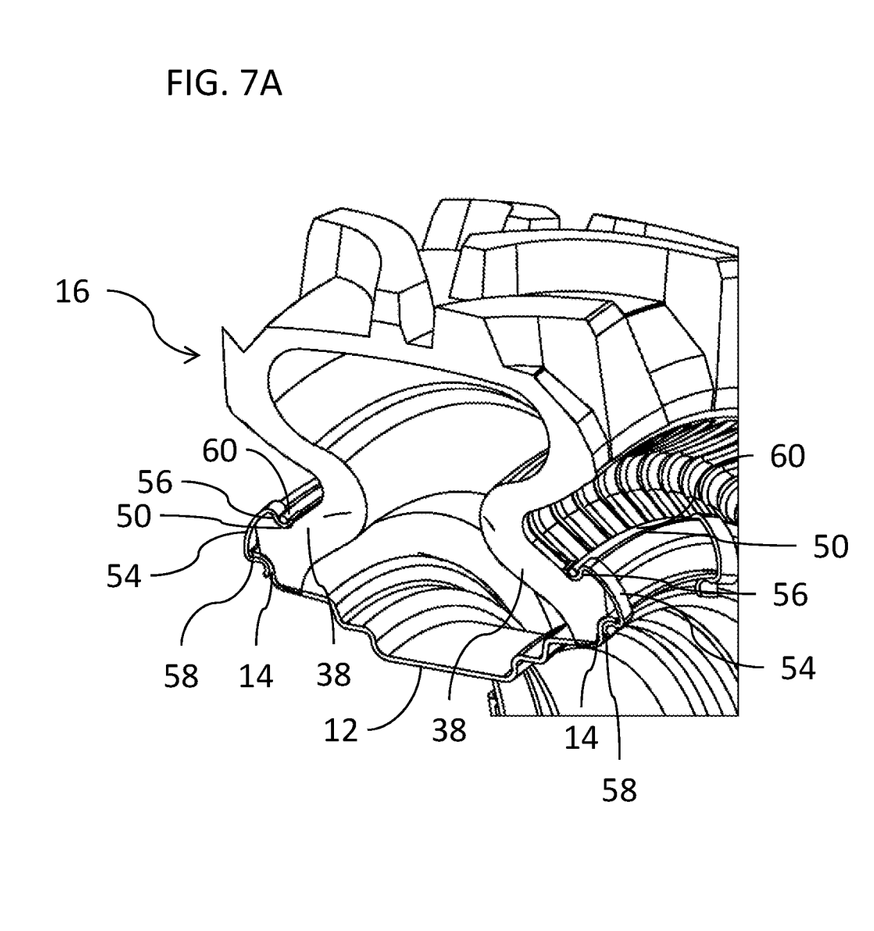
FIGS. 7A and 7B are views similar to FIGS. 3A and 4, respectively, illustrating a further variant implementation of a beadlock clip and corresponding tire configuration, constructed and operative according to the teachings of an embodiment of the present invention.

FIGS. 7A-9 illustrate variant implementations of the embodiment of the invention. In the case of FIGS. 7A and 7B, slot 50 and the corresponding first engagement portion 56 of the clip 54 are formed with relatively shallow engagement, and fixation of the clip to the tire is achieved by a clamping cable 60 which passes over engagement portions 56. Cable 60 may be formed of any suitable non-stretchable or slightly-stretchable cable. Typically, steel cable is used, but in some, cases various polymer or composite materials may be used. To accommodate engagement of clamping cable 60 with the clips, first engagement portion 56 is preferably formed with a channel for receiving part of the cable.

Figure 7B:
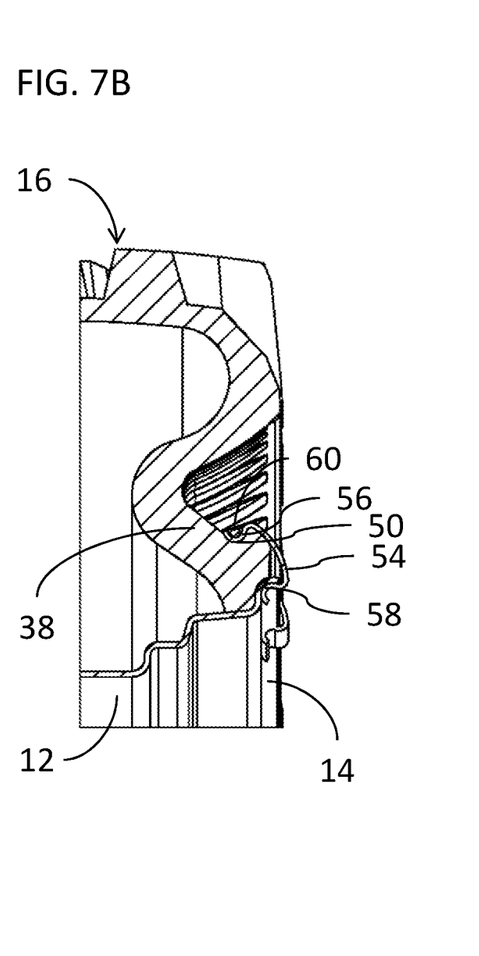

The reduced penetration of clip into a slot facilitates removal of the tire from a mold during manufacture of the tire, relying less on the post-molding flexibility of the warm material in the bead region. The use of a cable also serves to distribute the clamping forces from the clips more evenly around the tire.

Figure 8A:
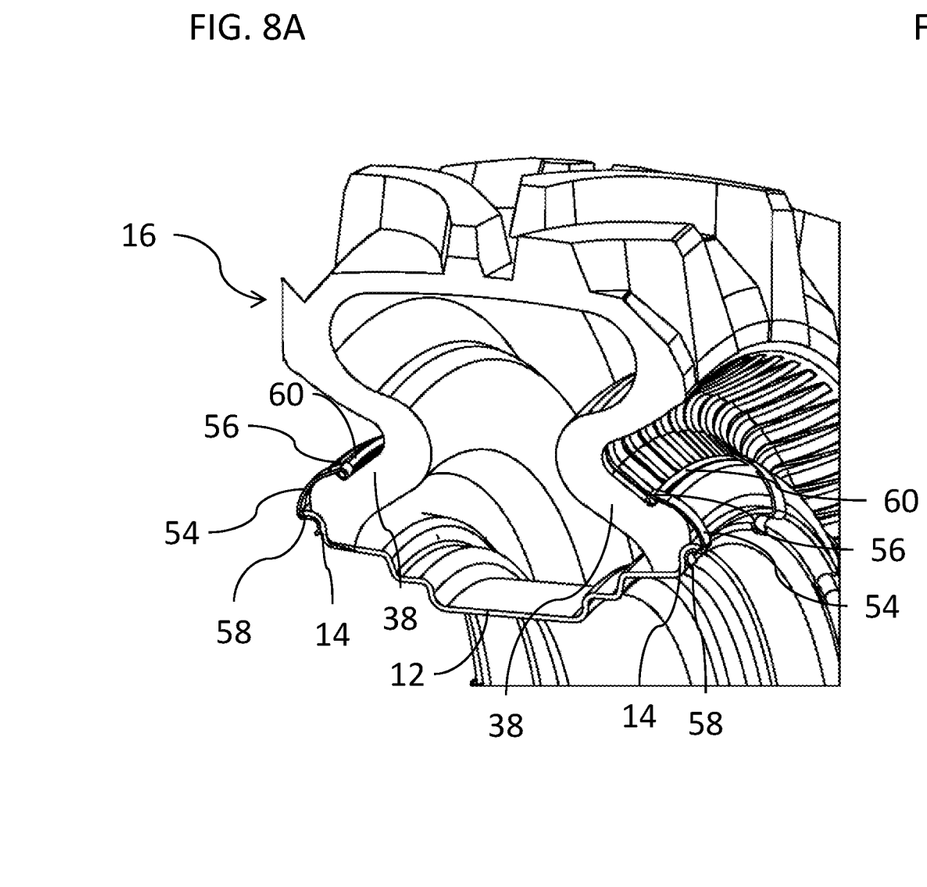
FIGS. 8A and 8B are views similar to FIGS. 3A and 4, respectively, illustrating another variant implementation of a beadlock clip and corresponding tire configuration, constructed and operative according to the teachings of an embodiment of the present invention.
Figure 8B:
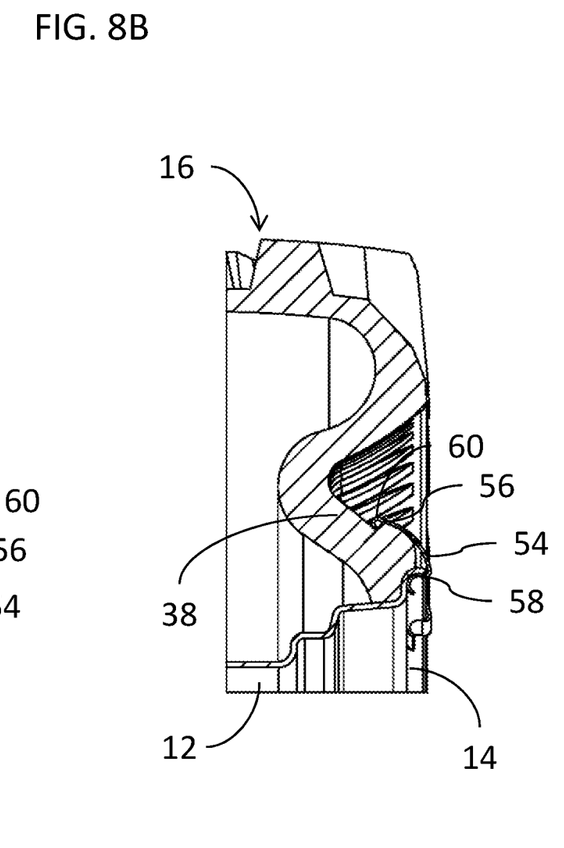

In the variant of FIGS. 8A and 8B, there is also provided a cable 60, which is preferably integrated with the rubber of the tire in a manner similar to the bead structure. In this case, engagement portion 56 is configured to hook onto the cable itself rather than a recess in the rubber of the tire, such that cable 60 provides the aforementioned abutment surface regions 52. The interface with the tire is in this case highly uniform, along the length of the cable 60.

Figure 9:
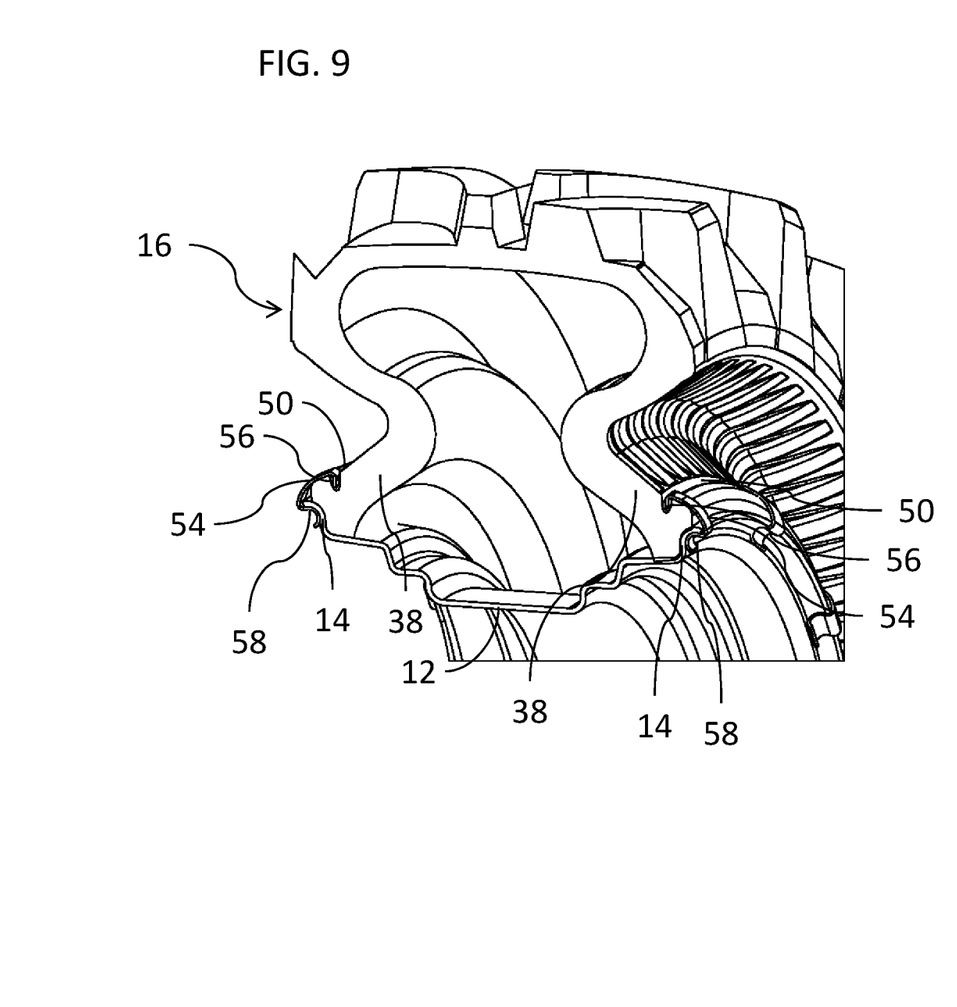
FIG. 9 is a view similar to FIG. 3A illustrating a further variant implementation of a tire configuration, constructed and operative according to the teachings of an embodiment of the present invention.

FIG. 9 illustrates a further variant similar to that of FIGS. 3A and 3B, but in which slot 50 is implemented as a single continuous slot extending around the tire.

Although described thus far as a number of separate clips, it will be noted that two or more clips may be implemented interconnected by a common backbone strip which extends around a part, or the entirety, of the bead area. In some cases, a continuous band may provide all of the "clips" in a single unit which is brought into position next to the rim lip and forced into engagement. In some cases, the beadlock clip functionality could be integrated with a "wheel cover" which also serves esthetic and/or other purposes.

Figures 10A, 10B:
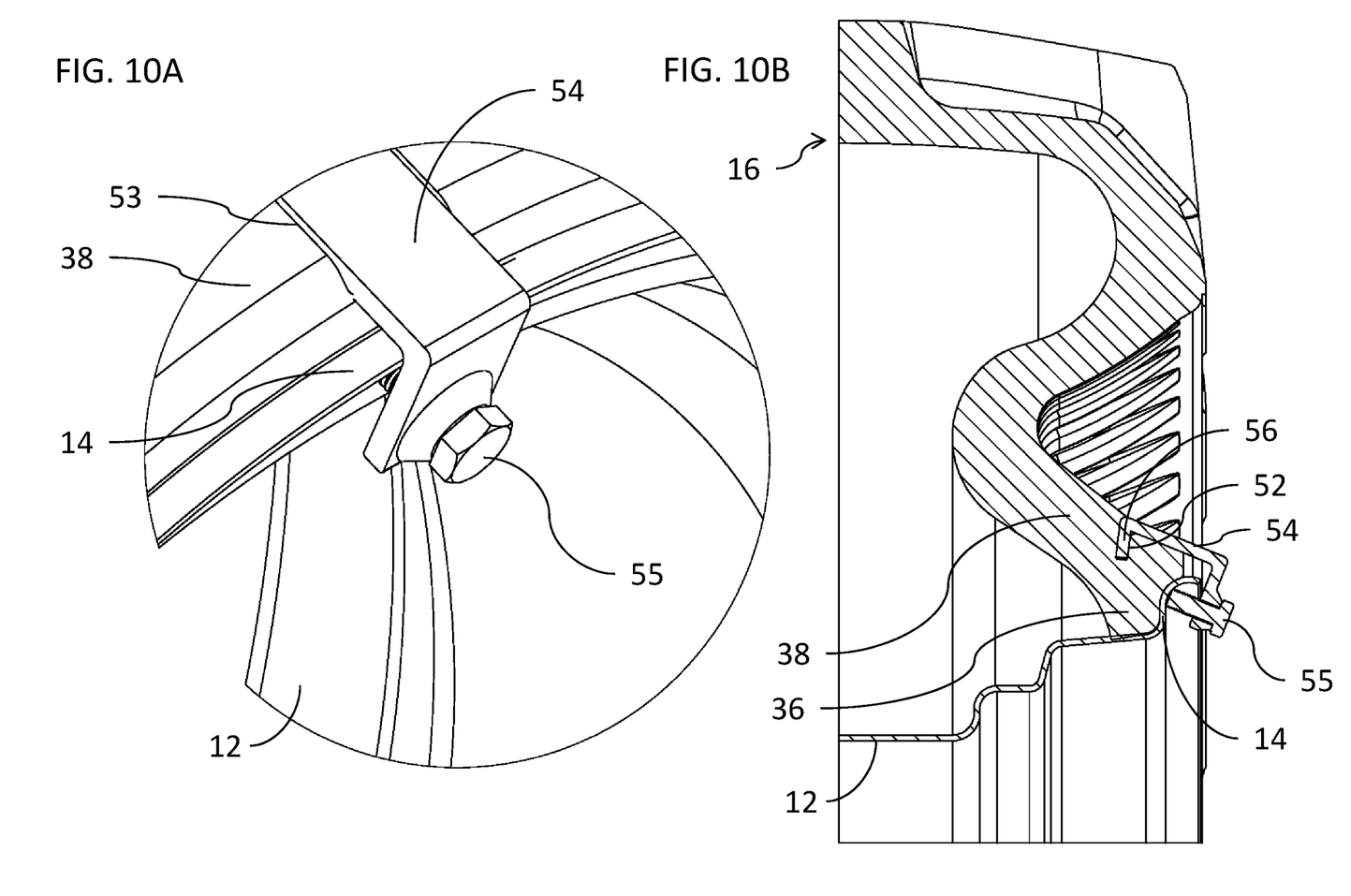
FIG. 10A is an enlarged partial isometric view illustrating an alternative implementation of a beadlock clip, constructed and operative according to an alternative embodiment of the present invention, including a positive tightening mechanism to clamp the beadlock clip in place.
FIG. 10B is a view similar to FIG. 4 illustrating deployment of the beadlock clip of FIG. 10A.
Figure 11A:
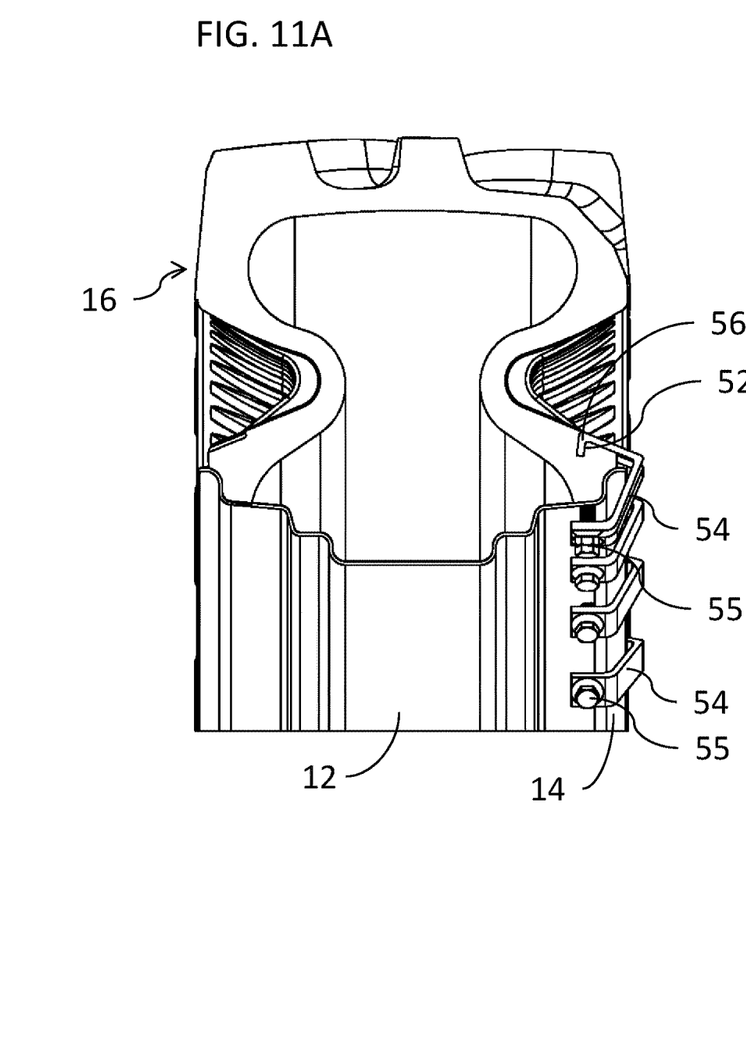
FIGS. 11A and 11B are a partial cross-sectional view and a partial cut-away isometric view, respectively, of a further alternative implementation of a beadlock clip and corresponding tire configuration, constructed and operative according to the teachings of an embodiment of the present invention, where the beadlock clip is deployed with a substantially radial clamping direction.
Figure 11B:
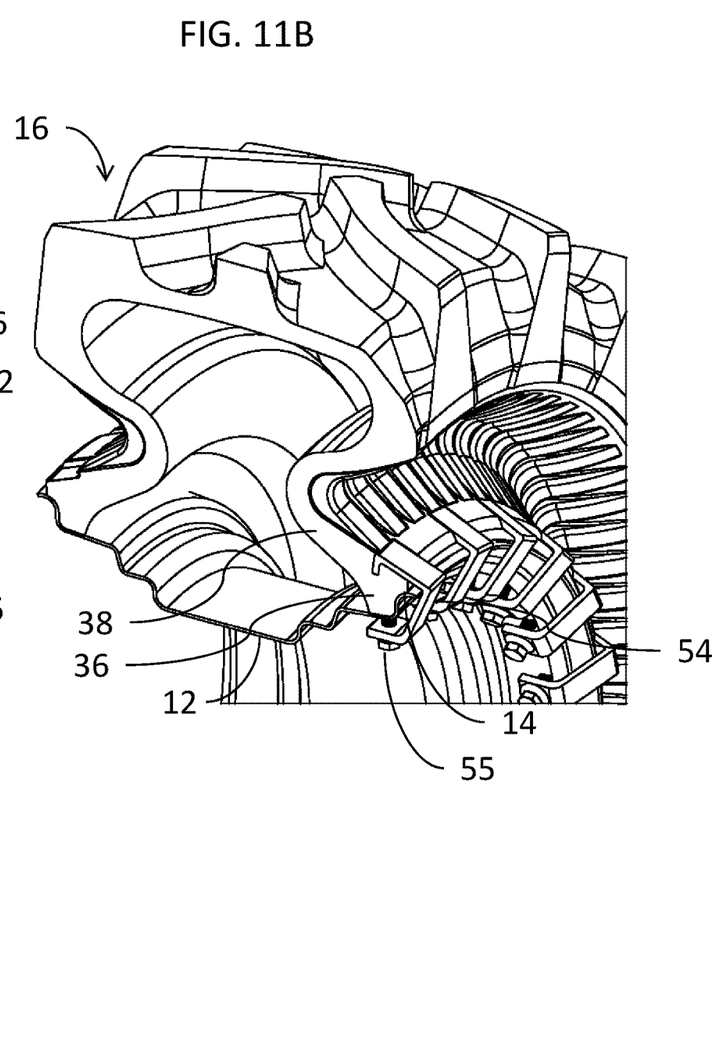

Although illustrated up to this point as a resilient clip, it should be noted that the beadlock clip of the present invention is not limited to resilient "snap-on" implementations, and may equally be implemented using any tightening or clamping mechanism, or another type of attachment configuration. Examples include, but are not limited to, various bold mechanisms or other threaded clamping mechanisms, various lever-based or cam-based clamping mechanisms, rivets, pins, and various latches, catches and clasps. Relatively rigid clips with positive clamping mechanisms are particularly suitable where very high loads are likely to be encountered. FIGS. 10A and 10B illustrate one such implementation in which beadlock clips 54 are implemented as rigid clamps which are tightened by turning a threaded bolt 55 which tightens against rim lip 14. In other respects, the structure and function of the wheel assembly is similar to that described above.

It should also be noted that the clamping direction of the various beadlock clips may vary considerably. In a first set of examples, as illustrated in FIGS. 3A-10B, and as specifically labeled in FIG. 5, the clamping direction is typically inclined to the axial direction of the wheel by an acute angle α, preferably between about 0° and about 60°, and most preferably between about 20° and about 50°, thereby providing a significant component of the clamping force which acts parallel to the wheel axis to help prevent separation of the tire bead from the rim lip.

In an alternative set of implementations, larger angles of inclination, even up to 90° (i.e., radial clamping) may be effective to ensure frictional locking of the tire bead against the wheel rim so as to fix the bead against movement relative to the rim.

FIG. 10 illustrates schematically another implementation of the invention using a positive clamping mechanism, here again exemplified by threaded bolts 55, for locking the bead of a tire (of the type described above) to the wheel rim, using a clamping direction which is substantially perpendicular (90°±15°) to the axial direction of the wheel. This case also illustrates that clamping may occur against the wheel rim at a location inwards from the bent-up shoulder of the rim lip. The clamping location is still typically part of the bead seat region of the rim. The implementation illustrated here is shown with clamping on one side wall of the tire only. Clearly, similar clamping may be used to advantage on both sidewalls if desired.

At this stage, it will be clear that certain embodiments of the present invention also provide functionality corresponding to an advantageous method of the present invention according to which the tire is first deployed on the rim with each of the bead regions seated against a corresponding one of the bead seats, and beadlock clips 54 are then attached, for example by the snap-on process described above with reference to FIGS. 6A-6D. The fact that the abutment surfaces 52 are externally accessible, as facilitated by the inward contour of first portion 38 of the sidewall, renders it possible to simply apply (and if necessary, remove) beadlock clips 54 after assembly of the tire on the rim.

It will be appreciated that the above descriptions are intended only to serve as examples, and that many other embodiments are possible within the scope of the present invention as defined in the appended claims.

What is claimed is:

1. A wheel assembly comprising:
    (a) a rim having two bead seats, each bead seat at least partially defined by a corresponding rim lip;
    (b) a tire mounted on said rim, said tire having two non-stretchable bead regions, each of said bead regions seated against a corresponding one of said bead seats, said tire having a non-stretchable tread extending between two shoulder regions, and two sidewalls, each side wall extending between one of said shoulder regions and a corresponding one of said bead regions, each of said sidewalls including a first wall portion adjacent to said bead region and extending inwards relative to a width of said tire to a deflection region, and a second portion extending outwards relative to the width of said tire from said deflection region to said shoulder region, thereby defining an annular recess in an outer surface of each of said side walls, wherein said first wall portion of at least one of said side walls provides a plurality of externally accessible abutment surface regions facing away from the corresponding rim lip and spaced around said first wall portion; and
    (c) a plurality of beadlock clips each having a first engagement portion that engages a corresponding one of said abutment surface regions and a second engagement portion that engages an opposing surface of said rim, said first and second engagement portions bearing inwards on said abutment surface region and said opposing surface so as to oppose separation of said bead region from said bead seat,
    wherein said abutment surface and said opposing surface define a clamping direction corresponding to a primary direction in which resilient clamping forces are applied by said beadlock clip when engaged with said abutment surface and said opposing surface, said clamping direction forming an acute angle with an inward axial direction of the wheel assembly,
    and wherein said abutment surface regions and said opposing surfaces of said rim are shaped such that said clamping direction extends along a local minimum of distance between said abutment surface region and said opposing surface.

2. The wheel assembly of claim 1, wherein said opposing surface of said rim is an outward-facing surface of said rim lip.

3. The wheel assembly of claim 1, wherein each of said beadlock clips is implemented as a resilient metal clip which is elastically deformable so as to be transiently deformed during deployment engaging said abutment surface and said opposing surface of said rim.

4. The wheel assembly of claim 1, wherein each of said beadlock clips is formed from strip material.

5. The wheel assembly of claim 1, wherein said abutment surface regions and said beadlock clips are provided on both side walls of said tire.

6. A wheel assembly comprising:
    (a) a rim having two bead seats, each bead seat at least partially defined by a corresponding rim lip;

(b) a tire mounted on said rim, said tire having two non-stretchable bead regions, each of said bead regions seated against a corresponding one of said bead seats, said tire having a non-stretchable tread extending between two shoulder regions, and two sidewalls, each side wall extending between one of said shoulder regions and a corresponding one of said bead regions, each of said sidewalls including a first wall portion adjacent to said bead region and extending inwards relative to a width of said tire to a deflection region, and a second portion extending outwards relative to the width of said tire from said deflection region to said shoulder region, thereby defining an annular recess in an outer surface of each of said side walls, wherein said first wall portion of at least one of said side walls provides a plurality of externally accessible abutment surface regions facing away from the corresponding rim lip and spaced around said first wall portion; and (c) a plurality of beadlock clips each having a first engagement portion that engages a corresponding one of said abutment surface regions and a second engagement portion that engages an opposing surface of said rim, said first and second engagement portions bearing inwards on said abutment surface region and said opposing surface so as to oppose separation of said bead region from said bead seat, wherein each of said abutment surface regions is associated with a recessed channel in the outer surface of said first wall portion such that at least part of said beadlock clip is countersunk in said outer surface.

7. A method for securing a wheel assembly, the method comprising the steps of:

(a) providing a wheel assembly comprising:

(i) a rim having two bead seats, each bead seat at least partially defined by a corresponding rim lip, and (ii) a tire having two non-stretchable bead regions, a non-stretchable tread extending between two shoulder regions, and two sidewalls, each side wall extending between one of said shoulder regions and a corresponding one of said bead regions, each of said sidewalls including a first wall portion adjacent to said bead region and extending inwards relative to a width of said tire to a deflection region, and a second portion extending outwards relative to the width of said tire from said deflection region to said shoulder region, thereby defining an annular recess in an outer surface of each of said side walls, wherein said first wall portion of at least one of said side walls provides at least one externally accessible abutment surface region facing away from the rim lip;

(b) deploying said tire on said rim with each of said non-stretchable bead regions seated against a corresponding one of said bead seats; and (c) attaching at least one beadlock clip with a first engagement portion engaging said abutment surface region and a second engagement portion engaging an opposing surface of said rim, said first and second engagement portions bearing inwards on said abutment surface region and said opposing surface so as to oppose separation of said bead region from said bead seat, wherein said beadlock clip is a snap-on clip which is transiently deformed during deployment engaging said abutment surface and said opposing surface of said rim.

8. The method of claim 7, wherein said at least one abutment surface region is implemented as a plurality of said abutment surface regions spaced around said first wall portion, and wherein said attaching is implemented as attaching a plurality of said beadlock clips.

9. The method of claim 8, wherein said opposing surface of said rim is an outward-facing surface of said rim lip.

\* \* \* \* \*